Feb. 5, 1946.   C. A. BARATELLI ET AL   2,393,955
VISOR ATTACHMENT FOR GOGGLES AND THE LIKE
Filed Feb. 4, 1944   2 Sheets-Sheet 1

Charles A. Baratelli
Clarence N. Cochran
Raymond N. Dockum and
James C. Gurney
INVENTORS BY Donald L. Brown
Attorney Patented Feb. 5, 1946

2,393,955

UNITED STATES PATENT OFFICE 2,393,955

VISOR ATTACHMENT FOR GOGGLES AND THE LIKE

Charles A. Baratelli, Cambridge, Clarence W. Cochran, Belmont, Raymond N. Dockum, Medford, and James E. Guernsey, West Roxbury, Mass., assignors to Polaroid Corporation, Cambridge, Mass., a corporation of Delaware Application February 4, 1944, Serial No. 521,084

17 Claims. (Cl. 2—13)

This invention relates to goggles, and more particularly to a new and improved visor attachment for goggles.

It is one of the objects of the invention to provide a visor attachment which may be quickly and easily mounted on a goggle and which is capable of carrying one or more visor elements adapted to shield the eyes of the wearer of said goggle.

Another object is to provide such a visor attachment wherewith the visor element may be readily rotated from a position out of the vision of the goggle wearer into operative position before his eyes and vice versa.

A further object is to provide such a visor attachment capable of carrying a plurality of visor elements so mounted as to be usable separately or in combination at the will of the wearer.

A still further object is to provide a visor attachment having the above advantages and wherewith also the visor elements may be quickly and easily interchanged or removed without disturbing the connection of the attachment to the goggle whereon it is mounted.

Additional objects and advantages will in part appear and in part be pointed out in the course of the following detailed description of one embodiment of the invention, which is given as a non-limiting example, in connection with the accompanying drawings, in which.

Figure 1:
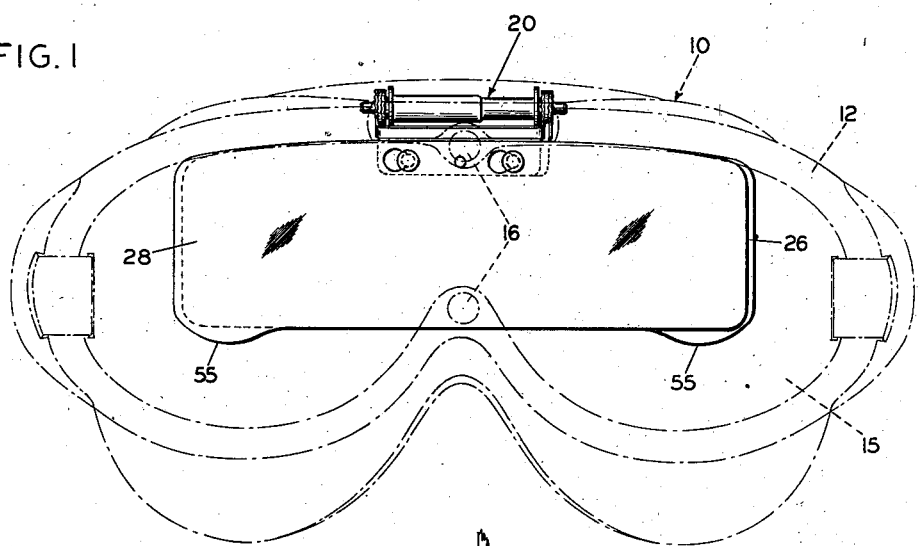
Figure 1 is a front elevation showing a visor attachment embodying a form of the invention mounted on a goggle and including a pair of visor elements both in operative position.
Figure 2:
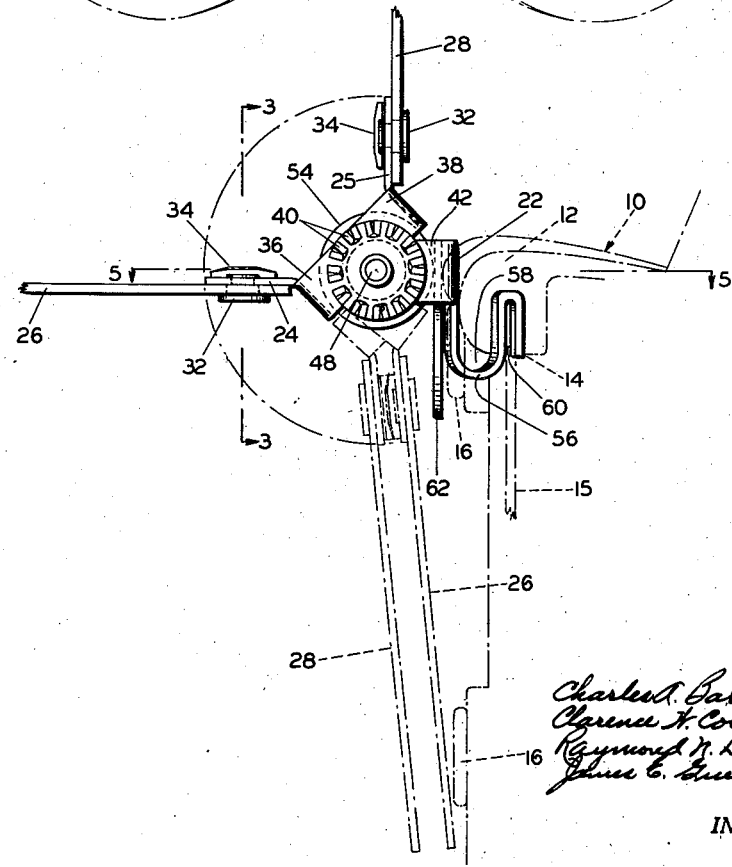
Figure 2 is a partial, enlarged side view of the visor attachment shown in Fig. 1, with the goggle being shown in dotted lines and cut away to illustrate the method of mounting the attachment thereon.

As is shown particularly in Figs. 1 and 2, it is an object of the present invention to provide convenient means for mounting one or more visor elements of transparent material before the eyes of the wearer of a goggle and to make it convenient to move said visors into or out of operative position. Goggle 10, shown fragmentarily in Figs. 1 and 2, is of the single aperture type and includes a rim portion 12 provided with a substantially continuous slot 14 in its inner side adapted to receive the periphery of lens blank 15, which is preferably of transparent plastic material. Elements 16 represent snap fasteners or similar devices adapted to aid in securing lens 15 within rim 12 and slot 14. It is to be understood, however, that goggle 10 is shown merely to facilitate description of the present invention and is not to be construed as in any way limiting the scope hereof.

Visor attachment 20 comprises a base plate 22 adapted to carry one or more visor-mounting plates 24, 25, each of which is in turn adapted to carry a visor element 26, 28. Visors 26 and 28 are preferably formed of transparent plastic material such, for example, as cellulose acetate. Although the invention may be used with only a single visor and visor plate, it has been found useful to employ a plurality of such elements, including visors of such optical properties that they may be used separately or in combination in the manner illustrated by dotted lines in Fig. 2. Thus for example, visor 26 may comprise yellow transparent plastic adapted to function as a haze filter, and visor 28 may comprise red transparent plastic having an absorption region overlying that of visor 26. Such a visor is useful in wartime as an aid in making visible the paths of tracer bullets against a blue sky. Another combination of visors might include light polarizing material such as one of the light polarizing materials sold under the trade name "Polaroid." It is to be understood, however, that the invention is not limited to any such particular combination or combinations, and that they are given only by way of illustration.

Figure 3:
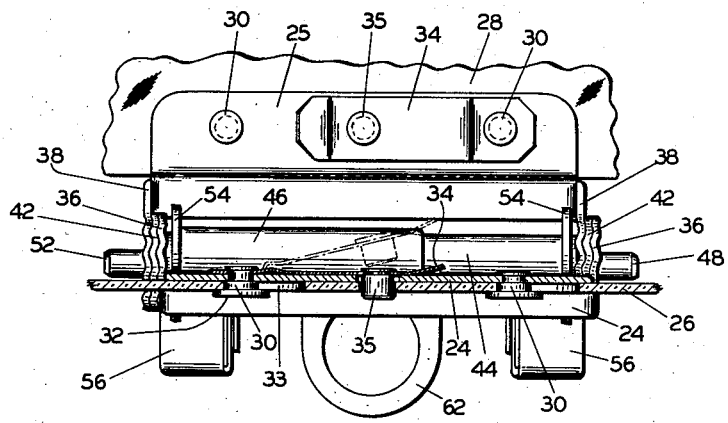
Figure 3 is a section taken on the line 3—3 in Fig. 2, omitting all showing of the goggle.
Figure 4:
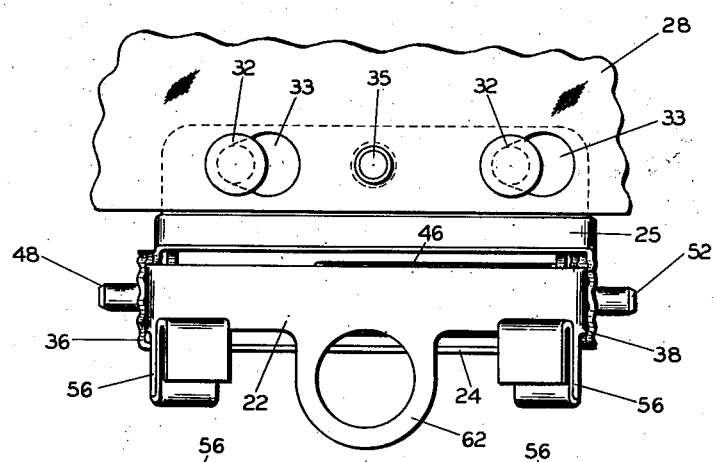
Figure 4 is a rear elevation of the visor attachment shown in Figs. 1-3.

Visor elements 26 and 28 may be secured to visor plates 24 and 25 in any of a variety of ways, but it is preferred that they be readily detachable for convenience of exchange or replacement. Means possessing this advantage are shown most clearly in Figs. 3 and 4. Each of visor plates 24 and 25 carries a plurality of projecting rivet elements 30 provided with heads 32 of substantially greater diameter than the shanks thereof. Each of visors 26 and 28 is in turn provided with a plurality of double-ended slots 33, one end being sufficiently large to pass heads 32 of rivets 30 and the opposite end being substantially smaller and preferably only large enough to accommodate the shanks of rivets 30. Each of visor plates 24 and 25 also carries a leaf spring 34 or similar element carrying a pin 35 extending through an aperture in said plate to engage a complementary aperture in one of visors 26, 28. It will accordingly be seen that one of said visors may be readily secured to one of elements 24 and 25 by engaging rivets 30 in slots 33 and then sliding the visor sidewise until pin 35 engages its complementary aperture and thereby locks the visor in position. Removal of the visor may be accomplished with equal ease by first disengaging pin 35 against the tension of spring 34, as illustrated by dotted lines in Fig. 3, and then sliding the visor sidewise until rivets 30 slip out of slots 33.

Figure 5:
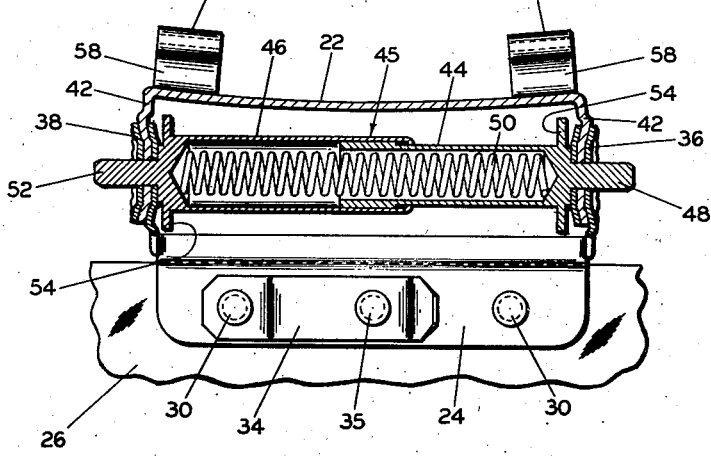
Figure 5 is a section taken on the line 5—5 in Fig. 2, omitting all showing of the goggle.

The means for securing elements 24 and 25 to base plate 22 are shown most clearly in Figs. 2 and 5. Each of plates 24 and 25 includes a pair of tab elements 36, 38 formed at their outer ends into a disk-shaped position provided with peripheral corrugations 40. Tabs 36 and 38 are adapted to overlie a similar pair of forwardly extending tabs 42 on base plate 22. Barrel 45 is composed of relatively telescoping cylinders 44 and 46 terminating in coaxial pins 48 and 52, which are adapted to engage in complementary apertures in each of tabs 36, 38 and 42 and thereby to provide a common pivotal connection for said tabs. Coil spring 50 within barrel 45 tends to force cylinders 44 and 46 apart and thereby exerts pressure on tabs 36, 38 and 42, causing corrugations 40 thereon to interlock.

It is believed that the operation and advantages of the above construction will in large measure be apparent from the foregoing description. The action of spring 50 in causing the corrugated portions of tabs 36, 38 and 42 to interlock holds visors 26 and 28 in any desired position until they are moved by a force sufficient to overcome the pressure of said spring. Either or both of visor plates 24 and 25 may be readily removed from base plate 22 by telescoping cylinders 44 and 46 sufficiently to disengage pins 48 and 52 from tabs 36, 38 and 42. To aid this operation said cylinders may be provided with flanged collars 54 adapted to be engaged by the finger and thumb of the wearer of goggle 10. Each of visors 26 and 28 may be provided with an extended tab portion 55 to facilitate separation if only one visor is desired in operative position. It will also be noted that the portion of each of visor plates 24 and 25 to which the visor is secured is inclined at an angle of the order of 135° to the portion carrying tabs 36 or 38, thus making it possible to arrange visors 26 and 28 in parallel and overlying position in the manner indicated by dotted lines in Fig. 2. At the same time, it will be apparent that either of said visor plates and its attached visor may be removed from base plate 22 without affecting the operation of the other said elements.

The method of securing attachment 20 to a goggle depends to a considerable extent upon the construction of the goggle itself. The attaching means shown in the drawings are particularly useful with goggles of the type of goggle 10 as described above. Arms 56 extend downwardly and rearwardly from base plate 22 in reverse loops which define a pair of U-shaped slots 58 and 60. The portions of said arms defining slots 60 are adapted to engage slot 14 in goggle rim 12, and slots 60 are in turn adapted to receive and retain the edge of lens 15. Similarly the forward portion of rim 12 is adapted to engage slots 58. There may also be provided a downwardly extended portion 62 on base plate 22 which will serve to brace attachment 20 against forward tilting movement. Element 62 is shown as substantially annular in shape, which not only reduces weight but also serves as a guide in centering the device with respect to upper fastening element 16. It will be apparent, however, that the mounting means for device 20 may be varied to fit other types of goggles without effecting the operation of the remainder of the device, and that the invention is accordingly not limited to the specific goggle or mounting means shown in the drawings.

It should also be noted that the visor attachment of the invention is not limited to use in combination with a goggle. By relatively simple modification of the mounting means for base plate 22, attachment 20 may be adapted for use in other ways. For example, such a device would readily lend itself to carrying visors of light-polarizing material for use in a system of polarized headlighting for vehicles. In that case, base plate 22 might be provided with means such as a headband for attachment to a vehicle driver's head or might be mounted directly to the vehicle in such position that the visors could be rotated in to and out of the line of the driver's vision. For such use, visor 26 might comprise light-polarizing material having its axis at 45° to the horizontal, and visor 28 might comprise half-wave retardation material having its axis at 22½° to the vertical, thus making the combined filters an analyzer for glare-producing, horizontally-vibrating light in the daytime. The converse of this arrangement would be equally useful. Similarly in a system of circularly polarized headlighting, visor 26 might comprise light-polarizing material having its axis vertical in order to analyze glare-producing polarized light in the daytime, and visor 28 might comprise quarter-wave retardation material having its axis at 45° to that of the polarizing material and thus converting said polarizing material into an analyzer for circularly polarized light. It is to be understood that all such modifications are contemplated by the present invention and are to be construed as coming within the scope thereof.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A visor attachment for goggles and the like, comprising in combination, a base member, mounting means for said base member, a visor-carrying members, means for securing a visor to said visor-carrying member, means for connecting said visor-carrying member to said base member for rotation on a predetermined axis when mounted in position on a goggle, said connecting means comprising means providing a pair of projecting tab elements on said base member and a pair of complementary tab elements on said visor-carrying member and means providing a pivotal connection between said tab elements, said last named means comprising barrel means comprising a pair of relatively telescoping cylinder elements having an axially compressible spring therewithin, each of said cylinder elements having coaxial pin means at the outer end thereof, said barrel means being positioned within said tab elements with said pin means journaled in complementary apertures in said tab elements, said spring and said cylinder elements urging said tab elements into relative frictional engagement and thereby controlling relative rotation between said visor-carrying member and said base member.

2. A visor attachment for goggles and the like, comprising in combination, a base member, mounting means for said base member, a visor-carrying member, means for securing a visor to said visor-carrying member, means for connecting said visor-carrying member to said base member for rotation on a predetermined axis when mounted in position on a goggle, said connecting means comprising means providing a pair of projecting tab elements on said base member and a pair of complementary tab elements on said visor-carrying member and means providing a pivotal connection between said tab elements, said last named means comprising barrel means comprising a pair of relatively telescoping cylinder elements having an axially compressible spring therewithin, each of said cylinder elements having coaxial pin means at the outer end thereof, said barrel means being positioned within said tab elements with said pin means journaled in complementary apertures in said tab elements, each of said tab elements comprising a substantially disk-shaped portion provided with substantially peripheral corrugations, said spring and said cylinder elements urging the corrugated portions of adjacent complementary tab elements into relative locking engagement and thereby controlling relative rotation between said visor carrying member and said base member.

3. A visor attachment for goggles and the like, comprising in combination, a base member, mounting means for said base member, a pair of visor-carrying members, each of said visor-carrying members comprising a plate element comprising two portions inclined at an angle of the order of 135° to each other, means for securing a visor to one of said portions of each of said visor-carrying members, means providing a pair of tab elements on the other portion of each of said visor-carrying members, said tab elements being positioned at angles of substantially 90° to said visor-carrying member and extending in a direction away from said visor element, shaft means journaled in said tab elements, and means for mounting said shaft means on said base member.

4. A visor attachment for goggles and the like, comprising in combination, a base member, mounting means for said base member, a pair of visor-carrying members, each of said visor-carrying members comprising a plate element comprising two portions inclined at an angle of the order of 135° to each other, means for securing a visor to one of said portions of each of said visor-carrying members, means providing a pair of tab elements on the other portion of each of said visor-carrying members, said tab elements being positioned at angles of substantially 90° to said visor-carrying member and extending in a direction away from said visor element, means providing a plurality of forwardly extending tab elements on said base member adapted to overlap said tab elements on said visor-carrying members, and means providing a horizontal pivotal connection between all of said tab elements, said last named means comprising barrel means comprising a pair of relatively telescoping cylinder elements having an axially compressible spring therewithin, each of said cylinder elements having coaxial pin means at the outer end thereof, said barrel means being positioned within said tab elements with said pin means journaled in complementary apertures in said tab elements, each of said tab elements comprising a substantially disk-shaped portion provided with substantially peripheral corrugations, said spring and said cylinder elements urging the corrugated portions of adjacent complementary tab elements into relative locking engagement and thereby controlling relative rotation between said visor-carrying member and said base member.

5. A visor attachment for goggles and the like, comprising in combination, a base member, mounting means for said base member, a visor-carrying member comprising a plate element, a sheet-like visor element comprising a transparent, plastic material, spring-actuated means for releasably securing said visor element to said visor-carrying member, means for connecting said visor-carrying member to said base member for rotation on a predetermined axis when mounted in position on a goggle, and means providing spring-actuated frictional engagement between said visor-carrying member and said base member for controlling rotation therebetween.

6. A visor attachment for goggles and the like, comprising in combination, a base member, mounting means for said base member, a visor-carrying member comprising a plate element, a sheet-like visor element comprising a transparent, plastic material, means for releasably securing said visor to said visor-carrying member, said last named means comprising, in combination, a plurality of rivet elements mounted on said visor-carrying member and provided with heads substantially larger in diameter than the shanks thereof, said visor element being provided with a plurality of slotted apertures adapted to engage said rivet elements, one end of each of said slots being capable of passing the heads of said rivet and the other end being substantially smaller, and means for locking said visor element against sliding movement with respect to said visor-carrying member when said rivet elements are engaging the smaller ends of said slots, means for connecting said visor-carrying member to said base member for rotation on a predetermined axis when mounted in position on a goggle, and means providing spring-actuated frictional engagement between said visor-carrying member and said base member for controlling rotation therebetween.

7. A visor attachment for goggles and the like, comprising in combination, a base member, mounting means for said base member, a visor-carrying member comprising a plate element, a sheet-like visor element comprising a transparent, plastic material, means for releasably securing said visor to said visor-carrying member, said last named means comprising, in combination, a plurality of rivet elements mounted on said visor-carrying member and provided with heads substantially larger in diameter than the shanks thereof, said visor element being provided with a plurality of slotted apertures adapted to engage said rivet elements, one end of each of said slots being capable of passing the heads of said rivet and the other end being substantially smaller, means comprising a leaf spring element mounted on said visor-carrying member, a pin element carried by said spring element, and means providing an aperture in said visor element adapted to coincide with said pin element when said rivet elements are engaging the smaller ends of said slots, said pin element being adapted to engage said aperture and thereby to lock said visor element against sliding movement with respect to said visor-carrying member, means for connecting said visor-carrying member to said base member for rotation on a predetermined axis when mounted in position on a goggle, and means providing spring-actuated frictional engagement between said visor-carrying member and said base member for controlling rotation therebetween.

8. A visor attachment for goggles and the like, comprising in combination, a base member, mounting means for said base member, a visor-carrying member comprising a plate element comprising two portions inclined at an angle of substantially 135° to each other, a sheet-like visor element comprising transparent plastic material, spring-actuated means for releasably securing said visor element to one of said portions of said visor-carrying member, means providing a pair of tab elements on the other portion of said visor-carrying member, said tab elements being positioned at angles of substantially 90° to said visor-carrying member and extending in a direction away from said visor element, shaft means journaled in said tab elements, and means for mounting said shaft means on said base member.

9. A visor attachment for goggles and the like, comprising in combination, a base member, mounting means for said base member, a visor-carrying member comprising a plate element, a sheet-like visor element comprising a transparent, plastic material, means for releasably securing said visor to said visor-carrying member, said last named means comprising, in combination, a plurality of rivet elements mounted on said visor-carrying member and provided with heads substantially larger in diameter than the shanks thereof, said visor element being provided with a plurality of slotted apertures adapted to engage said rivet elements, one end of each of said slots being capable of passing the heads of said rivet and the other end being substantially smaller, means comprising a leaf spring element mounted on said visor-carrying member, a pin element carried by said spring element, and means providing an aperture in said visor element adapted to coincide with said pin element when said rivet elements are engaging the smaller ends of said slots, said pin element being adapted to engage said aperture and thereby to lock said visor element against sliding movement with respect to said visor-carrying member, means for connecting said visor-carrying member to said base member for rotation on a predetermined axis when mounted in position on a goggle, said connecting means comprising means providing a pair of projecting tab elements on said base member and a pair of complementary tab elements on said visor-carrying member and means providing a pivotal connection between said tab elements, said last named means comprising barrel means comprising a pair of relatively telescoping cylinder elements having an axially compressible spring therewithin, each of said cylinder elements having coaxial pin means at the outer end thereof, said barrel means being positioned within said tab elements with said pin means journaled in complementary apertures in said tab elements, each of said tab elements comprising a substantially disk-shaped portion provided with substantially peripheral corrugations, said spring and said cylinder elements urging the corrugated portions of adjacent complementary tab elements into relative locking engagement and thereby controlling relative rotation between said visor-carrying member and said base member.

10. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member and engaging said slot in said goggle frame and said lens therein, a visor-carrying member, means for securing a visor to said visor-carrying member, means for connecting said visor-carrying member to said base member for rotation on a predetermined axis when mounted in position on a goggle, and means providing spring-actuated frictional engagement between said visor-carrying member and said base member for controlling rotation therebetween.

11. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member and engaging said slot in said goggle frame and said lens therein, means for bracing said base member against forwardly tilting movement, a visor-carrying member, means for securing a visor to said visor-carrying member, means for connecting said visor-carrying member to said base member for rotation on a predetermined axis when mounted in position on a goggle, and means providing spring-actuated frictional engagement between said visor-carrying member and said base member for controlling rotation therebetween.

12. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member in a plurality of reverse loops defining a plurality of U-shaped slots, said goggle frame engaging the first of said slots, said arm portion defining each of the second of said slots engaging said slot in said goggle frame and said lens engaging said second slots, a visor-carrying member, means for securing a visor to said visor-carrying member, means for connecting said visor-carrying member to said base member for rotation on a predetermined axis when mounted in position on a goggle, and means providing spring-actuated frictional engagement between said visor-carrying member and said base member for controlling rotation therebetween.

13. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member in a plurality of reverse loops defining a plurality of U-shaped slots, said goggle frame engaging the first of said slots, said arm portion defining each of the second of said slots engaging said slot in said goggle frame and said lens engaging said second slots, a further downwardly extending portion of said base member engaging the front of said goggle frame and bracing said base member from forwardly tilting movement, a visor-carrying member, means for securing a visor to said visor-carrying member, means for connecting said visor-carrying member to said base member for rotation on a predetermined axis when mounted in position on a goggle, and means providing spring-actuated frictional engagement between said visor-carrying member and said base member for controlling rotation therebetween.

14. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member in a plurality of reverse loops defining a plurality of U-shaped slots, said goggle frame engaging the first of said slots, said arm portion defining each of the second of said slots engaging said slot in said goggle frame and said lens engaging said second slots, means providing a plurality of forwardly extending, vertically disposed tab elements on said base member, a visor-carrying member, means for securing a visor to said visor-carrying member, means providing a plurality of tab elements on said visor-carrying member, means for pivotally connecting said tab elements on said visor-carrying member to said tab elements on said base member for relative rotation on a predetermined axis, and means providing spring actuated frictional engagement between said relatively rotatable tab elements for controlling relative rotation between said visor-carrying member and said base member.

15. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member in a plurality of reverse loops defining a plurality of U-shaped slots, said goggle frame engaging the first of said slots, said arm portion defining each of the second of said slots engaging said slot in said goggle frame and said lens engaging said second slots, means providing a plurality of forwardly extending, vertically disposed tab elements on said base member, a visor-carrying member, means for securing a visor to said visor-carrying member, means providing a plurality of tab elements on said visor-carrying member corresponding to said tab elements on said base member, each of said tab elements on each of said members comprising a substantially disk-shaped portion provided with substantially peripheral corrugations, means for pivotally connecting said tab elements on said visor-carrying member to said tab elements on said base member for relative rotation on a predetermined axis, and yieldable means urging adjacent complementary tab elements together and thereby causing the corrugated portions of said tab elements to interlock and hold said visor-carrying member against free rotation.

16. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member in a plurality of reverse loops defining a plurality of U-shaped slots, said goggle frame engaging the first of said slots, said arm portion defining each of the second of said slots engaging said slot in said goggle frame and said lens engaging said second slots, means providing a plurality of forwardly extending, vertically disposed tab elements on said base member, a visor-carrying member, means for securing a visor to said visor-carrying member, means providing a plurality of tab elements on said visor-carrying member corresponding to said tab elements on said base member, each of said tab elements on each of said members comprising a substantially disk-shaped portion provided with substantially peripheral corrugations, and means for pivotally connecting said tab elements on said visor-carrying member to said tab elements on said base member for relative rotation on a predetermined axis, said last named means comprising barrel means comprising a pair of relatively telescoping cylinder elements having an axially compressible spring therewithin, each of said cylinder elements having coaxial pin means at the outer end thereof, said barrel means being positioned within said tab elements with said pin means journaled in complementary apertures in said tab elements, said spring and said cylinder elements urging the corrugated portions of adjacent complementary tab elements into relative locking engagement and thereby controlling relative rotation between said visor-carrying member and said base member.

17. In combination with a goggle comprising a lens and frame means provided with a slot in the inner side thereof adapted to receive and retain the periphery of said lens, a visor attachment comprising, in combination, a base member, means for mounting said base member on said goggle, said means comprising a plurality of arms extending downwardly and rearwardly from said base member in a plurality of reverse loops defining a plurality of U-shaped slots, said goggle frame engaging the first of said slots, said arm portion defining each of the second of said slots engaging said slot in said goggle frame and said lens engaging said second slots, means providing a plurality of forwardly extending, vertically disposed tab elements on said base member, a visor-carrying member, a sheet-like visor element comprising a transparent, plastic material, spring-actuated means for releasably securing said visor element to said visor-carrying member, means providing a plurality of tab elements on said visor-carrying member corresponding to said tab elements on said base member, each of said tab elements on each of said members comprising a substantially disk-shaped portion provided with substantially peripheral corrugations, and means for pivotally connecting said tab elements on said visor-carrying member to said tab elements on said base member for relative rotation on a predetermined axis, said last named means comprising barrel means comprising a pair of relatively telescoping cylinder elements having an axially compressible spring therewithin, each of said cylinder elements having coaxial pin means at the outer end thereof, said barrel means being positioned within said tab elements with said pin means journaled in complementary apertures in said tab elements, said spring and said cylinder elements urging the corrugated portions of adjacent complementary tab elements into relative locking engagement and thereby controlling relative rotation between said visor-carrying member and said base member.

CHARLES A. BARATELLI.
CLARENCE W. COCHRAN.
RAYMOND N. DOCKUM.
JAMES E. GUERNSEY.